ASSOCIATIVE DATA PROCESSING SYSTEM

Filed Dec. 22, 1966

4 Sheets-Sheet 1

INVENTOR
JAMES L. CASS
BY Joseph R. Dwyer
ATTORNEYS

INVENTOR
JAMES L. CASS
BY
Joseph Dwyer
ATTORNEYS

INVENTOR
JAMES L. CASS
BY Joseph R. Dwyer
ATTORNEYS

ASSOCIATIVE DATA PROCESSING SYSTEM

Filed Dec. 22, 1966 4 Sheets-Sheet 4

INVENTOR
JAMES L. CASS
BY Joseph R. Dwyer
ATTORNEYS 3,456,243
Patented July 15, 1969

3,456,243

ASSOCIATIVE DATA PROCESSING SYSTEM

James L. Cass, Sunland, Calif., assignor to Singer-General Precision, Inc., a corporation of Delaware Filed Dec. 22, 1966, Ser. No. 603,850
Int. Cl. G06f *1/04, 7/28*
U.S. Cl. 340—172.5 16 Claims

ABSTRACT OF THE DISCLOSURE

A data search and retrieval system in which an associative memory is combined with a disc file to search blocks of data, stored therein in a plurality of tracks. Each block is associated with a storage element forming a compare flag in the associative memory. In a search mode, each block is compared with a query data block in accordance with any of a plurality of search criteria. At the end of the search, the compare flags associated with matched blocks are in a first binary state while all others are in a second binary state. The compare flags in the first binary states are utilized to control the sequential readout of matched blocks or selected portions thereof in an optimum, minimum number of revolutions of the disc file.

BACKGROUND OF THE INVENTION

Field of the invention

This invention relates to a data processing system and, more particularly, to a system in which data is retrieved by associative searching techniques from a body of data appearing cyclically.

Description of the prior art

Great progress has been made in the field of data processing. Memories are presently available which are capable of storing large quantities or bodies of data, while systems and techniques have been developed, whereby selected portions of the stored data can be retrieved. In some techniques, data is retrieved on the basis of its known location in memory, while in other techniques the content of data is used to determine the data portions to be retrieved. The latter technique, often referred to as content addressable or associative searching, though highly desirable because of the relatively short time required for the retrieval operation, has herebefore been employed only with specially designed memories in which data storage means is adapted for content searching.

Some memories are often referred to as content addressable or associative memories. They are generally relatively complex and expensive, both increasing as the size of the body of data storable therein increases. Therefore, their use has generally been limited to systems in which the body of data is relatively small. Data processing systems which contain large quantities of data, generally utilize relatively less expensive memories which do not lend themselves to simple, efficient and speedy content searching. As a result, designers in the field of data processing strive to develop systems in which large bodies of data can be searched, and selected data retrieved therefrom, with a minimum of retrieval time, yet prevent the cost of the system from being so prohibitively high as to prevent the actual manufacturing and commercial use thereof.

OBJECTS AND SUMMARY OF THE INVENTION

Accordingly, it is an object of the present invention to provide a new improved data processing system.

Another object is to provide a system for the efficient processing of a large body of data with a relatively short retrieval time.

A further object is the provision of a data processing system in which associative searching techniques are employed to retrieve data from a relatively large body.

Still a further object is to provide a system for retrieving data by associative searching techniques from a large body of data, stored in a relatively inexpensive, large non-associative type memory.

These and other objects are achieved by providing a system in which a large body of data is stored in a relatively inexpensive type memory, from which data may be cyclically read out. One type of such a memory is a disc file, consisting of magnetic discs. Each disc consists of one or more sections, each consisting of a large number of tracks, divided into fixed number of sections or blocks. Each block is of the same length in number of bits. A single write/read head is associated with each track. The data is in the form of records, each storable in an integer number of successive blocks. However, for explanatory purposes, the invention will first be described in conjunction with an embodiment in which each block is assumed to consist of a complete record. A relatively small associative memory is also included. However, unlike prior art systems in which the associative memory stores actual data, in the present invention, the associative memory has the function of storing binary signals, hereafter referred to as compare flags, which represent the results of the comparison between each block in a given memory section with a selected block of data, representing a query record.

Briefly, during the searching of the disc memory to determine which records compare with the query record, all the tracks of a given memory section are read out simultaneously, providing as many bit streams. The query record and other signals which define a search criterion with which the query record is to be compared with each readout block, are contained in a plurality of circulating registers. These registers, each having a number of bits equal to the number of bits of a memory block, operate bit serially in synchronism with the blocks on the disc memory. As a result, each block is compared, bit-by-bit, with the query block, with the comparison results being stored in the form of compare flags in the associative memory. Consequently, at the end of one revolution of the disc memory, the compare flags in the associative memory represent which of the blocks in the memory section compare with the query record. The associative memory may then be interrogated in a novel manner, to be described hereafter in detail, to sense the compare flags and use them to control the reading out of the blocks associated therewith in a minimum of disc revolutions, thereby minimizing the retrieval time.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
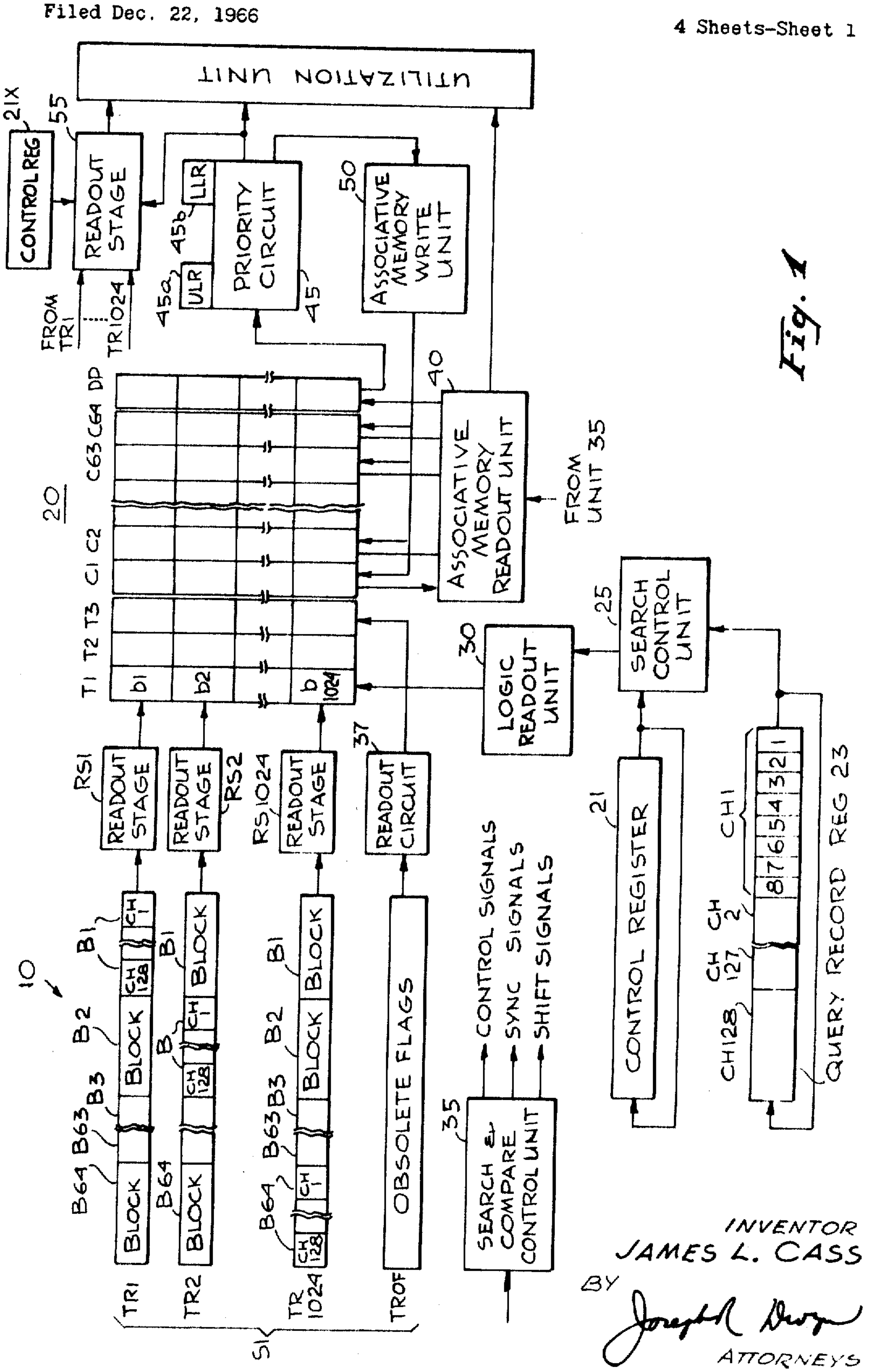
FIGURE 1 is a simplified block diagram of the present invention.

Reference is now made to FIGURE 1 which is a simplified block diagram of one embodiment of the present invention. As previously stated, all the data, consisting of the body of data, is assumed to be stored in a relatively inexpensive memory such as a disc file memory, generally designated in FIGURE 1 by numeral 10. Though for explanatory purposes the invention will be described in conjunction with a disc file, other type memories, from which data can be read out cyclically, may be employed as memory 10. For example, drums, delay lines, and other similar memories may be used. Also, the term memory should be interpreted broadly to include any arrangement in which streams of data bits arrive in parallel in a fixed sequence. For example, the arrangement may include a plurality of serial shift registers, or the like.

When memory 10 is a disc file, it includes magnetic discs on which data is stored. Each disc may be divided into one or more sections, each containing a plurality of tracks. In FIGURE 1, one section S1 is shown consisting, for explanatory purposes only, of 1024 data tracks designated TR1 through TR1024. Each data track is shown divided into 64 sections or blocks B1 through B64. As previously indicated, the stored data consists of records which are stored in an integer number of blocks. Initially, the invention will be described, assuming that each block stores a separate record, i.e. one block per record. Therefore, initially, the terms block and record will be used interchangeably.

In FIGURE 1, each block is assumed to consist of 128 bytes or characters CH1–CH128, each of eight bits, so that any one of 256 different alphanumeric symbols can be stored in each character. Thus each record is assumed to be contained in the 1024 bits of the block thereof, with sixty-four records stored in each track.

In addition to the 1024 data tracks, each section, such as S1, is shown including a track, designated TROF, in which obsolete flags in the form of binary signals are stored. An obsolete flag is included for each block in the section. The function of the flag is to indicate whether the content of the block with which it is associated is meaningful or not. Thus, it may be used to obsolete a block without actually having to erase the block. It can be used to determine the locations of blocks in which new data may be written into, as well as, be used in the searching and retrieval of data, as will be explained hereafter in detail.

As is appreciated by those familiar with the art, data may be read out of a track of a magnetic disc memory by a read head associated with the track so that as the disc revolves, the head provides a stream of bits. In the present invention, it is assumed that each of tracks TR1–TR1024 has a read head associated therewith so that as the disc, of which section S1 forms a part, revolves the heads provide in parallel streams of bits to readout stages RS1 through RS1024, respectively. These stages include sense amplifiers and other circuitry which will be explained hereafter in detail.

In addition to disc memory 10 which includes section S1 with as many as 64 x 1024 blocks or records stored therein, the invention includes a relatively small associative-type memory 20 which may be thought of as consisting of 64 compare fields C1–C64, three tag fields T1, T2 and T3, and a detector plane field DP. Each field comprises 1024 bits, designated ***b*1–*b*1024** with corresponding bits being associated with different data tracks. The number of bits in each field corresponds to the number of data tracks in a section, while the number of compare fields is equal to the number of blocks in each track. All the bits in the compare fields may be thought of as forming a compare flag array of 64 x 1024 bits.

In addition, the embodiment of the invention includes two circulating registers designated control register 21 and query record register 23. Each register is one block long, i.e. 1024 bits. As seen from FIGURE 1, the register 23 consists of 128 characters CH1 through CH128, each of eight bits. The function of the register 23 is to store the record forming the query record with which each of the records in section S1 is to be compared, while the register 21 is used to select, in accordance with what search criterion the comparison of each character in the register 23 is to be compared with corresponding characters in the various blocks. However, to simplify the description of the invention, it is first assumed that each bit in register 23 is compared for equality with each bit of each block in S1 so that register 21 may initially be disregarded.

The output of register 23 is shown supplied to a search control unit 25 which is also supplied with the output of register 21. Unit 25 is in turn connected to a logic readout unit 30, the output of which is coupled to the T1 field. Each readout stage is also coupled to its corresponding bit in the T1 field.

The operations of the various means described heretofore are controlled by a control unit which synchronizes the operations of necessary portions of the system, as well as provides control signals in accordance with a programmed sequence. Such a control unit may form part of a utilization unit to which retrieved data or information about data matching the query record may be supplied. For example, the utilization unit may be a general or special purpose computer which may use the retrieved data for any desired purpose such as updating and then rewrite the data into the memory 10. For explanatory purposes, numeral 35 designates such a control unit which is labeled search and compare control unit. Also, it is assumed that the retrieved data is supplied to a circuit or system, generally referred to as the utilization unit.

Briefly, in a search operation in which the locations of records or blocks which compare bit-by-bit with the query record in register 23 are searched for, the content of register 23 is supplied bit-by-bit to unit 30 through unit 25, while corresponding bits are read out from memory 10 into stages RS1 through RS1024. Unit 30 and stages RS1 and RS1024 are operated so that at the end of each character period, i.e. the time required for a complete character to be read out, the bit in the T1 field associated with each stage RS is at a selected binary state such as a "1" when the character, supplied to its stage, is identical with that supplied to unit 30 by register 23. Otherwise, the corresponding bit in the T1 field is set to a "0." For example, if CH1 of B1 in track TR1 matches CH1 in register 23 and the CH1 characters in the B1 blocks of TR2 and TR1024 do not, at the end of the first character period or interval, bit *b*1 of T1 is a "1" while bits *b*2 and *b*1024 of T1 are set to a "0."

At the end of each character interval, the content of T1 field is logically ANDed into the T2 field where the comparison of each block with the record in register 23 is accumulated from character to character. Prior to the search operation, all the bits in the T1 and T2 fields are "1's." In the foregoing example where after searching CH1 only *b*1 of T1 is left a "1" while *b*2 and ***b*1024 of T2** are set to be "0's," as a result of the ANDing operation, bit *b*1 of T2 remains a "1" while bits *b*2 and ***b*1024 of T2 are set to a "0." Once a bit in T2 is set to a "0," then irrespective of the matching of subsequent characters of the block being read out with characters in the register 23, it remains a "0" to indicate that at least one character of the block did not match a corresponding character in register 23**.

Field T2 may be thought of as accumulating the results of block comparisons from character to character, while the state of each bit in T1 indicates the comparison between a character read out from the track associated therewith and the character from register 23. Prior to the beginning of each character comparison, the bits in the T1 field are set to be "1's" with only the bits associated with the character from register 23 remaining "1's" at the end of the character comparison interval, while all other bits in the T1 field being set to be "0's."

Figure 2:
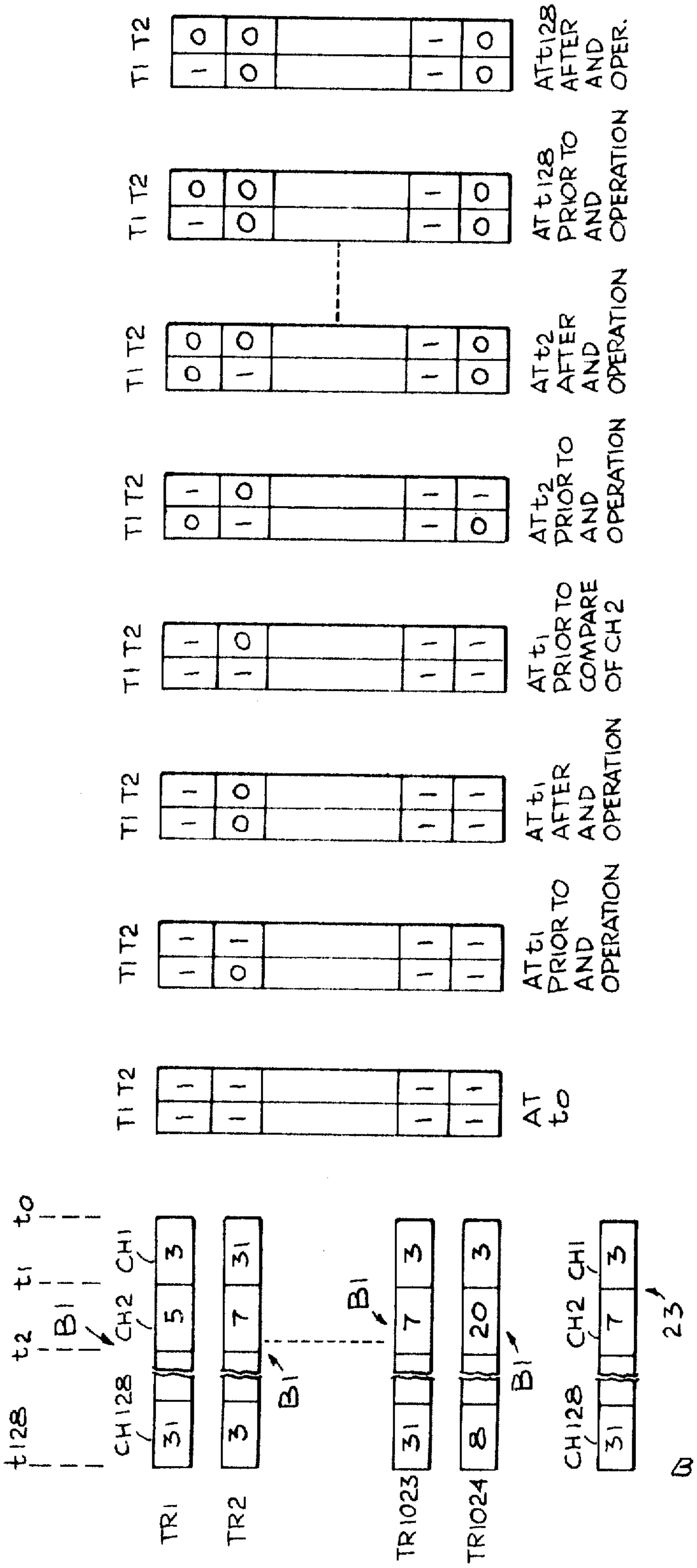
FIGURE 2 is a diagram useful in explaining selected tag fields in the associative memory, shown in FIGURE 1.

These characteristics of the invention may further be explained with a specific example diagrammed in FIGURE 2. Therein, blocks B1 in tracks TR1, TR2, TR1023, and TR1024 are shown with a numerical content of the first (CH1), second (CH2), and last (CH128) characters thereof. The content of characters CH1, CH2 and CH128 of register 23 forming the query record are exemplified as 3, 7, and 31 respectively. In the example, each character is assumed to be a number and since each character consists of eight bits, the largest possible number is 256. In FIGURE 2, $t_0$ represents a time just before character CH1 of the various block and register 23 are read out, while $t_1$ is a time between the read out of CH1 and CH2, $t_2$ a time interval between CH2 and CH3, and $t_{128}$ after the read out of the blocks B1. The binary states of the various bits of the T1 and T2 fields are diagrammed during these various intervals.

From FIGURE 2, it is seen that at time $t_0$ all the bits of T1 and T2 are "1's." At time $t_1$, just before the AND operation, all but *b*2 of T1 are "1's" and *b*2 of T1 is a "0," since number 31 in CH1 of B1 of TR2 did not match the 3 in CH1 of register 23. Then, the T1 and T2 bits are ANDed so that *b*2 of T2 also becomes a "0." Thereafter, prior to the comparison operation of the CH2 characters, the T1 bits are set again to "1's." Then at the end of the comparisons of the CH2's, both bits *b*2 and *b*1023 are "1's" while *b*1 and *b*1024 are "0's" since the 5 and 20 contained in CH2 of B1 of TR1 and TR1024 respectively did not match the 7 in CH2 of register 23. The ANDing operation is then performed and the comparison continued until the complete blocks are read out. From the extreme right-hand diagram of fields T1 and T2, it is seen that after the last characters CH128 are read out and the last AND operation performed, only *b*1023 of T2 is a "1" since only block B1 in track TR1023 matches the record in register 23, character for character.

While each block B1 is compared with the record in register 23, character-by-character, bit-by-bit obsolete flags from track TROF associated with the B1 blocks in tracks TR1 through TR1024 are read into the corresponding bits in field T3, through a readout circuit 37 (FIGURE 1). It is appreciated that since each block contains 128 characters, each of eight bits for a total of 1024, all the bits in T3 are filled at the end of the comparison of blocks B1 with register 23. Thus, at time $t_{1023}$ after the last AND operation (FIGURE 2), the bits in fields T2 and T3 are filled. Corresponding bits are ANDed, with the results stored in the C1 field. Assuming that all the obsolete flags are "1's," i.e. all the B1 blocks are assumed to contain meaningful data, it is appreciated that in the example of FIGURE 2, only bit 1023 of C1 will be set to a "1" since only bit 1023 of T2 is a "1." The fact that only *b*1023 of C1 is set to a "1" indicates that only B1 in track TR1023 matched the record in query register 23.

After the bits in T2 and T3 are ANDed and the results stored in field C1, the bits in T3 are set to "0's" and the bits in T1 and T2 to "1's" to start the comparison of the B2 blocks in the tracks TR1 through TR1024. At the end of the comparison of blocks B2, only the bits in T2 which correspond to tracks in section S1 in which the B2 blocks compared with the record in register 23 are set to "1's." If the obsolete flags in T3 associated with the "1" bits in T2 are also "1's," the corresponding bits in C2 are set to "1's," with all others set to "0's."

This process continues for each block so that at the end of one revolution of the disc memory 10, i.e., after all 64 blocks of each track have been read out, all the C fields, C1–C64, are filled with "1's" or "0's." "1's" represent the locations of blocks which matched the record in register 23. The content of the C fields forming the compare array or matrix may be thought of as forming a map of the blocks in section S1 which match the record in register 23. Various uses may be made of such a map, depending on the purpose of comparing the query record (in register 23) with the blocks in the memory section S1. For example, all the "1's" in the C fields may be counted to determine the number of "1's" in the field and thereby statistically indicate the number of blocks in S1 which matched the query record. As previously indicated, the system disclosed herein is assumed to be associated with a utilization unit which controls, by means of unit 35 (FIGURE 1), the operation of the various circuits and subsystems disclosed herein. Thus, the use made of the map formed by the bits in the compare fields depends on the user of the desired information.

For explanatory purposes only, FIGURE 1 is shown including an associative memory readout unit 40 which is assumed to be connected to the compare fields so that either a row or column of bits may be transferred thereto from the compare fields. Unit 40 may be controlled by unit 35 to supply the content of the compare fields read out thereto to the utilization unit. It is appreciated by those familiar with the art, that various presently known techniques may be employed for such content transfer. Such techniques form the basis of most present-day computers, especially those employing associative memories. Therefore, detailed description of unit 40 is not included.

Figure 3:
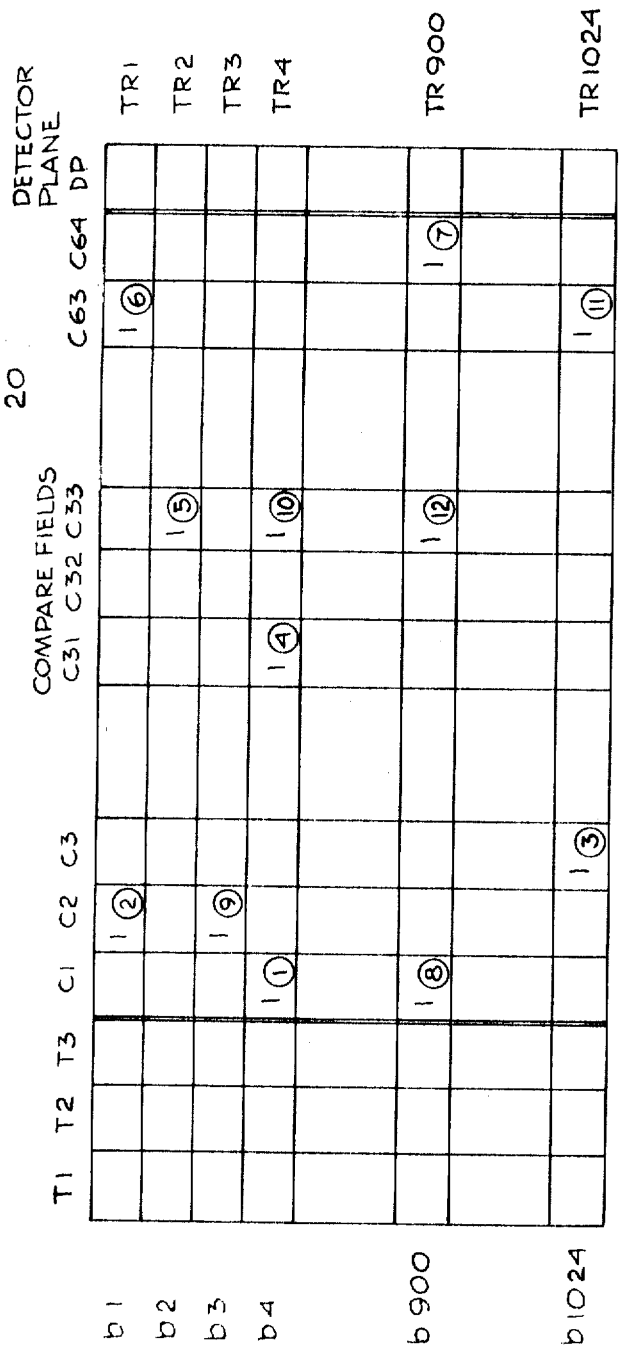
FIGURE 3 is a diagram useful in explaining the use made of compare flags in accordance with the teachings of the invention.

In addition to using the content of the compare fields C for statistical purposes, one of the basic functions which fields C may perform is directed to an efficient readout operation of the blocks in memory 10 section S1 which compared with the query record in register 23. It is the efficient readout operation which forms one of the main objects of the present invention. This aspect of the invention may best be described in conjunction with FIGURE 3 in which the associative memory 20 is again diagrammed. In FIGURE 3, fields T1, T2, T3 are included to show the complete associative memory 20 though these fields are not used once the compare fields C1–C64 are filled. Let it be assumed that only those bits in the C fields containing a "1" are actually set to a "1" while all others contain "0's." Thus, from the foregoing, it should be appreciated that in section S1 only twelve blocks matched the query record in the register 23 (FIGURE 1), since only twelve bits in the compare fields are "1's."

One simple though inefficient way of reading out of memory 10 those blocks which matched the query record, is to use the bits in the compare fields associated with each track on a sequential track-by-track basis to control which blocks from each track are read out. For example, in a first revolution of memory 10, the bits *b*1 in C2 and C63 may be used to control a readout stage associated with tracks TR1–TR1024 so that only blocks B2 and B63 in TR1 are read out. During a subsequent revolution, *b*2 in C33 may be used to control the readout stage so that only block B33 of TR2 is read out, since this block is the only one in the track which matched the query record as indicated by the fact that only one bit *b*2 is a "1," while all others are "0's." From the foregoing, it should be appreciated that in such an arrangement, the disc memory 10 must revolve 1024 times before all the blocks which compared with the query record in register 23 have been read out.

A more efficient readout arrangement, in accordance with the teachings of the invention, may be briefly described as one in which the content of each compare field is interrogated while the memory disc is in a position in which blocks associated with a preceding compare field can be read out. The least significant "1" bit of the interrogated field is used to control the readout of its respective block when the memory disc rotates to be in position to read the block associated with the interrogated field. In FIGURE 3, the topmost bit in each field is assumed to be the least significant.

For a better understanding of the latter aspect of the invention, reference is made again to FIGURE 3. Let it be assumed that the last blocks B64 of tracks TR1 and TR1024 are read out and compared with the query record in reference 23 as herebefore described, resulting n a "1" stored in *b*900 of C64. At the same time, the content of C1, associated with the succeeding blocks, i.e. B1, s transferred to a detector plane (DP) field through unit 40 (FIGURE 1). The DP field may be thought of as a parallel input register. Its content is then supplied to a priority circuit, designated in FIGURE 1 by numeral 45. Basically, the function of unit 45 is to select the least significant bit in the compare field, supplied to it, which is a "1." Assuming bit *b*1 of C1 is the least significant and *b*1024 the most significant, it is seen from FIGURE 3 that bit *b*4 of C1 is selected, since it is the least significant bit with a "1." Once the selection is made, circuit 45 transfers the bits of the C1 field to an associative memory write unit 50 (FIGURE 1) which rewrites the bits in the C1, as originally transferred except for the selected bit *b*4 which is set to a "0." That is, all the bits in C1 are written as "0's" except *b*900 which was originally a "1" and was not selected.

The selection of bit *b*4 of C1 as the least significant "1," is used by the priority circuit 45 to control a readout stage 55 which is supplied with streams of bits from all tracks. When the bits of blocks B1 of all tracks are supplied, only the stream from track TR4 with which *b*4 is associated, is permitted to pass to the utilization unit. Thus, only block B1 of track TR4 which matched the query record is read out. The system may include an additional control register 21*x*, which controls stage 55 so that of the matched block, only selected portions thereof are read out to the utilization unit.

As the B1 blocks are read out from memory 10 to stage 55, field C2 associated with blocks B2 is transferred to the DP field and therefrom, to circuit 45 in which *b*1 of C2, being the least significant bit, is selected. As a result, when blocks B2 are read out, circuit 45 controls stage 55 so that only the stream of bits of block B2 in track TR1 are read out to the utilization unit. It should be pointed out again that when field C2 is rewritten, bit *b*1 after being selected in 45 is set to a "0" so that only *b*3 in C2 remains a "1."

This process continues so that readout to the utilization unit occurs only when a bit has been selected from a compare field associated with the particular blocks which are read out. In FIGURE 3, the encircled numbers, ①–⑫, indicate the sequence of selected bits which control the readout of the retrieved or readout blocks.

From the foregoing, it should be appreciated that during the first revolution of memory 10, seven blocks are read out in the following sequence: B1 of TR4, B2 of TR1, B3 of TR1024, B31 of TR4, B33 of TR2, B63 of TR1 and B64 of TR900. While B64 of TR900 is read out, the C1 field is again transferred to the DP field and priority circuit 45. Since previously *b*4 of C1 was reset to a "0," only *b*900 of C1 is a "1." Thus, it is selected by circuit 45 so that when in a subsequent revolution, the B1 blocks are again supplied to state 55 only B1 of track TR900 is read out. This process continues so that during the second revolution bits *b*900 of C1, *b*3 of C2, *b*4 of C33 and *b*1024 of C63, control the readout through unit 55 to the utilization unit of blocks B1 of TR900, B2 of TR3, B33 of TR4 and B63 of TR1024.

During the third revolution, all the bits of fields C1 through C32 are "0" so that none of the first thirty-two blocks of any of the tracks is read out to the utilization unit. However, when field C33 is transferred to the circuit 45 in which bit *b*900 is selected, when the blocks B33 of all tracks are read out, unit 45 enables stage 55 to read out block B33 of track TR900 to the utilization unit. Thus, the last of the twelve blocks is read out.

From the foregoing, it is thus seen that in two full revolutions of disc memory 10 plus the time to get to block 33, all the records or blocks which compared with the query record could be read out. This is possible because of the novel use of the bits in the compare fields C1–C64 to control which blocks are read out. Hence, the number of revolutions of disc memory 10 required from data retrieval is greatly reduced. Actually, the maximum number of required revolutions for retrieval equals the maximum number of "1's" in any of the compare fields. In the foregoing example, more than two complete revolutions are required because of the three "1's" in field C33.

Herebefore, it has been assumed that retrieval is performed on matching blocks in all of tracks TR1 to TR1024, forming the complete section S1 (FIGURE 1). However, the invention is not limited thereto. Rather, means may be provided to control the priority circuit 45 to consider only selected portions of each field of bits supplied thereto and thereby limit the region of section S1 from which data is retrieved. In such a case, priority circuit 45 may include an upper limit register (ULR) 45*a* (FIGURE 1) and/or a lower limit register (LLR) 45*b*. The function of these registers is to limit the portion of each field of bits operated upon by circuit 45. For example, registers 45*a* and 45*b* may be set so that priority circuit 45 selects the least significant bit only from bits TR3 through TR900, while ignoring the other bits, regarding them as "0's." Then from the foregoing, it is appreciated that in such a situation none of the blocks in tracks TR1, TR2 and TR901 through TR1024 will be selected even though such tracks may include matching blocks. It is appreciated from FIGURE 3 that if tracks TR3 through TR900 are selected as the region of interest, the readout time would be the time of one revolution of the memory 10 plus the time required to get to block 33. On the other hand, if tracks TR900 through TR1024 are selected, ignoring the matching blocks in tracks TR1 through TR899, one single revolution suffices to retrieve all matching blocks.

Since in data processing, the time required for various operations is significant, it is most desirable to be able to sense when all the desired records to be retrieved have been read out so that the associated system may perform other functions. The end of the readout operation may be easily sensed by utilizing the bits in the compare fields of memory 20. From the foregoing, it should be appreciated that after all the records have been retrieved, all the bits in the C fields are "0's." Thus, in accordance with the teachings of the invention, the end of the readout operation may be sensed by performing a logical ORing operation on all the bits in the C fields prior to each step in which a C field is transferred to the DP field. If the ORing operation indicates that all the bits in the C fields are "0's," it represents that all records have been read out, thereby indicating the completion of the readout operation. If, however, the ORing operation indicates that not all the bits are "0's," the readout operation continues.

The system of the present invention may be summarized as consisting of a relatively inexpensive memory, such as a disc file, in which a large body of records in the form of multibit blocks are stored on magnetic discs. The disc file may be thought of as the data memory. In conjunction with this memory, a relatively small associative-type memory including associated control circuits are employed.

As the data memory revolves so that corresponding blocks (such as B1, B2, etc.) in each section are read out in parallel, the blocks are compared with a query record in query register, which may be part of the associative memory. The results of the comparison of each block on a character-by-character, bit-by-bit basis, with the query records, as well as a function of the obsolete flag associated therewith, are stored as a compare flag or bit in a compare field associated with the particular block. Thus, the binary state of the compare flag is a function of the content of the record associated therewith as well as external qualification, provided by the obsolete flag. The number of compare fields equals the number of blocks in a data track of the memory section, while the number of bits in each compare field equals the number of data tracks in the section.

After a complete section is read out, the states of the bits in the compare field represent a map of the blocks in the readout section matching the query record. A binary "1" may be used to indicate a match and a "0," the absence thereof. The bits in the compare field may then be used for statistical purposes, as well as to control the retrieval of match blocks as herebefore described. It is appreciated that the circuits designated 40, 45 and 50 as well as the circuits related to the query record register 23 may all form part of the control circuitry of the associative memory 20. Both the memory 10 and the associative memory are assumed to be controlled by unit 35 which, as herebefore explained, may be part of the utilization unit to which the retrieved data or information is supplied. Herebefore, the invention has been described in conjunction with multibit characters. It should be appreciated that the teachings are equally applicable to an arrangement in which each data character consists of a single bit.

In the foregoing description, it has been assumed that each record is contained in a complete block. However, as previously stated, the invention is not limited thereto. The teachings disclosed herein are applicable to retrieving multiblock records as well. For example, let it be assumed that section S1 stores records, each two blocks long, with the odd blocks storing the first halves of the records and the succeeding even blocks the other halves. Then, in accordance with the teachings of the invention, the query register 23 is first loaded with the first half of the query record and all odd blocks (B1, B3, etc.), compared therewith, storing the results in compare fields C1, C3, etc. Then, the register 23 is loaded with the second half of the query record and during a subsequent revolution of disc memory 10, the even blocks in S1 are compared with the content of 23, storing the results in the even compare fields C2, C4, C6, etc.

Thereafter, corresponding bits in adjacent C fields are logically ANDed, to determine whether all compare bits associated with blocks forming a complete record are "1's." Only such bits are left in a "1" state in the compare field array. For example, bits *b*1 in C1 and C2 are ANDed. If both are "1's" indicating that blocks B1 and B2 of TR1 matched the first and second halves of the query record, sequentially loaded in register 23, i.e., matched the two-block query record, the bits in *b*1 of C1 and C2 remain "1's." However, if only one of the bits, such as *b*1 of Cl, is a "1" and *b*1 of C2 a "0," it indicates that only blocks B1 matched the first half of the query record, but B2 did not match the second half. As a result, *b*1 of C1 is set to a "0" to prevent the readout of only a portion of a record which did not completely match the query record. Thereafter, the matched multiblock records are read out or retrieved by the use of the "1" bits in the compare field, as herebefore explained.

As previously described the function of the T1 field is to provide an indication, at the end of each character interval of the comparison of the characters read out from memory 10, with the character from the query register 23. For a complete description of one embodiment of field T1 and the readout stages RS1–RS1024, as well as units 25 and 30 (FIGURE 1), reference is made to FIGURE 4. Therein, the associative memory 20 of which the T1 and T2 fields form a part, is assumed to consist of a plurality of plated magnetic wires of the type, capable of storing binary signals or bits as a function of the direction of circumferential flux at different points along their plated magnetic surface. Such wires and their storing capabilities have been described in the literature and are well known to those familiar with the computer art.

Figure 4:
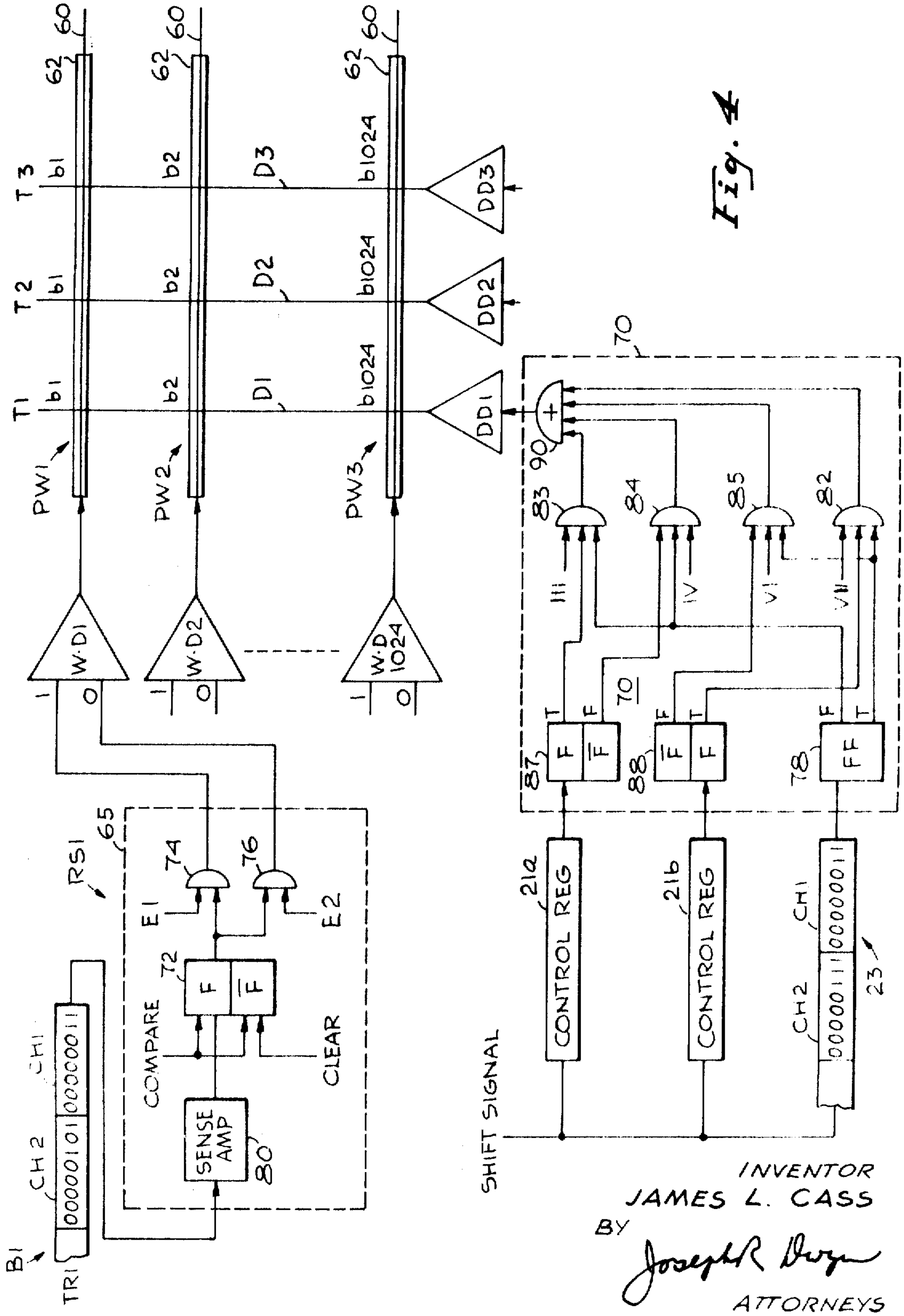
FIGURE 4 is a block diagram showing portions of the circuitry diagrammed in FIGURE 1 in greater detail.

In FIGURE 4, all the *b*1 bits of the memory 20 are assumed to be formed of plated wire PW1, while bits *b*2 . . . *b*1024 are formed of plated wires PW2 through PW1024, respectively. Briefly, each of the plated wires consists of a nonmagnetic wire 60, such as copper, on which is plated a thin magnetic film 62. During the plating operation, a current is caused to flow in wire 60 in order to create a circumferential easy axis of magnetization in film 62. A plurality of lines, hereafter also referred to as digit lines, intersect each of the plated wires with the points of intersection of the plated wire with the digit lines representing bit locations or bits. In FIGURE 4, for example, the intersection of digit lines D1, D2 and D3 with PW1 represents locations of bits *b*1 of fields T1, T2 and T3, respectively. Each bit is controlled to store a binary signal as a function of the direction of circumferential flux thereat. The circumferential flux direction is controlled as a function of the coincidence and polarities of currents in the digit line from a respective digit driver designated DD1, DD2 and DD3 and current in wire 60 from a word driver to which wire 60 is connected. The current from the digit driver is unipolar, while that from the word driver is bipolar. In FIGURE 4, word drivers WD1, WD2 and WD1024 are shown connected to wires 60 of PW1, PW2 and PW1024 respectively.

Each word driver is shown having a 1 input and a 0 input. When the 1 input is true, the word driver provides a current of a first polarity, while a current of a second opposite polarity is provided when the 0 input is true. A "1" is stored in any of the bits, such as *b*1 of T1, when current flows in D1 and the current in 60 of PW1 is of the first polarity, while a "0" is stored when, in coincidence with the current in D1, the current in 60 is of the second polarity. To set all the bits in the T1 field to a "1" state, as is required before the start of the comparison of a character, all that is needed is to actuate the digit driver DD1 and set the 1 inputs of all word drivers to be true. Similarly, by actuating DD2, all the bits in field T2 may be set to a "1."

In accordance with the teachings of the invention, the output of track TR1 is connected to the word driver WD1 through a logic stage 65, which together with WD1 forms the readout stage RS1 (FIGURE 1). Similarly, each track is connected to a corresponding plated wire PW, through a logic stage 65 and the word driver, forming a readout stage RS. The output of the query register 23 is connected to the digit line D1 through the DD1 and logic stage 70 which together are assumed to comprise the units 25 and 30, shown in FIGURE 1 in block form. In addition, two control registers 21*a* and 21*b* are connected to the logic stage 70. Register 21*a* and 21*b* are represented in FIGURE 1 by the single control register 21.

Briefly, the stages 65 and 70 are also controlled by the search and compare control unit 35 (FIGURE 1) which supplies various circuits or gates in stages 65 and 70 with controlling signals in a multiphase programmed sequence during each bit interval, i.e. during the interval when a single bit is read out of each track and compared with the bit from register 23. The multiphase sequence of operation is diagrammed in chart form in FIGURE 5 to which reference is made herein. At the beginning of each bit comparison interval, during phase I, unit 35 clears a flip-flop 72 in logic stage 65 so that its output, connected to one input of each of AND gates 74 and 76, is false. Hereafter, false and true states are assumed to be represented by "0" and "1" binary signals respectively. Then, during phase II, query register 23 and registers 12*a* and 12*b* are shifted by a shift signal from unit 35, advancing the contents of the bits therein by one bit. Register 23 is connected to a flip-flop 78 in logic stage 70. FF 78 has true (T) and false (F) outputs connected to one input of AND gates 82 and 83 respectively. Thus, when a "1" is in the output bit of register 23, i.e. at the input of FF 78, as shown in FIGURE 4, the T output is true, while the F output is true when FF 78 is supplied with a "0" from the output bit 23.

Figure 5:
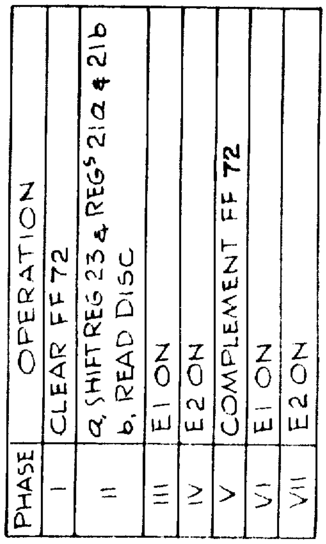
FIGURES 5 and 6 are charts useful in explaining the operation of the circuitry of FIGURE 4.

In FIGURE 4, FF 72 is shown connected to the output of the memory track TR1, with which it is associated, through a sense amplifier 80, the function of which is to set flip-flop 72 so that its output is a "1" when the track output is a "1" and to a "0" when the track output is a "0." The setting of FF 72 as a function of the track output is accomplished during phase II as indicated by "Read Disc" operation in FIGURE 5. Logic stage 70 includes flip-flops (FF) 87 and 88. The true (T) and false (F) outputs of FF 87 are connected to one input of AND gate 83 and an AND gate 84 respectively, while the T and F outputs of FF 88 are connected, respectively, to one input of gate 82 and an AND gate 85. For a comparison criterion of equality, that is, when the bits from the track and the register 23 are compared to see whether they are the same, FF's 87 and 88 are set to store a "0" and a "1" respectively, so that the F output of 87 and the T output of 88 are true. Each of gates 82–85 has one input which is set to true during one of phases VII, III, IV and VI respectively. The outputs of gates 82–85 are connected to the inputs of an OR gate 90, the output of which is connected to actuate digit driver DD1 when one of the gate's inputs is true.

As seen from the chart of FIGURE 5 and FIGURE 4, during each of phases III and VI, a true E1 signal is supplied to another input of AND gate 74 so that if both of its inputs are true, AND gate 74 is enabled, setting the 1 input of the word driver WD1 to provide a current in wire 60 to write a "1" in any of the bits of PW1, if the digit line of the bit carries current, coincidently. Similarly, during phases IV and VII, a true E2 signal is supplied to one input of AND gate 76, while during phase V, FF 72 is complemented by a complement signal from unit 35.

From the foregoing, it should be appreciated that with FF's 87 and 88 in a "0" and "1" state to which they are set for an equality comparison criterion, during none of the phases is coincident current present in wire 60 and the digit line D1, as long as the two compared bits from the track TR1 and the register 23 are the same. Consequently, the state of bit *b*1 in field T1 remains in the binary "1" state or a "1." If however a mismatch exists, current is present in the digit driver when the "0" input of the word driver is true, so that bit *b*1 in T1 is set to a binary "0." For example, assuming the bit from track TR1 is a "1" and that from register 23 is a "0," then during phase IV, the "0" input of the word driver WD2 is true, while at the same time gate 84 is enabled, actuating the digit driver DD1 through gate 90. Consequently, a "0" is stored in *b*1 of T1. The bit will remain in the "0" state even if subsequent bits match one another. Similarly, if the bit read out from track TR1 is a "0" and the bit from register 23 is a "1" coincident current for setting bit *b*1 of 71 will occur during phase VII.

In the example shown in FIGURE 4, block B1 of TR1 is read out character-by-character and bit-by-bit. The first two characters CH1 and CH2 are shown comprising numbers 3 and 5 respectively, while CH1 and CH2 in register 23 use a 3 and a 7 respectively. These numbers were selected to correspond to the example diagrammed in FIGURE 2. From the foregoing, it should be appreciated that after comparing the character CH1 in B1 of TR1 and register 23 bit-by-bit, bit *b*1 of T1 will remain in a "1" state. However, when comparing the second bit of character CH2 read out from track TR1 which is a "0," with the second bit of CH2 in register 23, a mismatch is sensed, causing bit *b*1 of T1 to be set to a "0" state.

Figure 6:
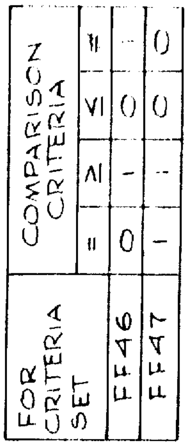

The circuitry shown in FIGURE 4 is not limited to controlling the setting of the bit *b*1 of T1 only when comparing characters on a bit-by-bit basis for equality. By controlling the settings of FF's 87 and 88 in logic stage 70, each multibit character read out from memory can be compared with the multibit character in register 23 on the basis of different comparison criteria. With both FF's 87 and 88 set to binary "1's," the bit *b*1 in T1 remains in a binary "1" state as long as the complete multibit character or number from memory is equal to or greater than the character or number from the register 23, with the comparison being performed on a bit-by-bit basis starting with the least significant bit. On the other hand, by setting FF's 87 and 88 to binary "0" states, the bit *b*1 in T1 remains in a binary "1" state as long as the character from memory is equal to or smaller than the character in the register 23. With FF's 87 and 88 set to a binary "1" and "0" state respectively, the bit *b*1 remains in a binary "1" state, irrespective of the comparison between the two compared multibit characters. FIGURE 6 is a simple chart representing the binary settings of FF's 87 and 88 for the various comparison criteria between the character or number read out from memory and the one in the query register 23. In FIGURE 6, the symbol # represents a non-significant comparison criterion so that the *b*1 bit in T1 remains in a "1" state irrespective of the numerical relationship between the two compared multibit characters.

The settings of FF's 87 and 88 may be controlled by bits in control registers **21*a* and 21*b* (FIGURE 4) respectively. For each character in a block, each control register may store eight bits which control the setting of the FF associated therewith. For example, for an equality comparison of CH1, register 21*a* stores eight "0's" while register 21*b* stores eight "1's" so that during the first eight bit intervals, FF's 87 and 88 are set to binary "0" and "1" respectively. On the other hand, if the content of each CH1 character in each block to be read out is not controlling for retrieval purposes, registers 21*a* and 21*b* store eight "1's" and "0's" respectively, so that as CH1 in register 23 is compared with each CH1 from memory 10**, a non-significant search criterion is employed and *b*1 of T1 remains a "1," irrespective of mismatches. Thus, each character in register 23 may be compared in accordance with a different search criterion with corresponding characters in the blocks read out from memory 10. For example, CH1 of a query record may be compared for equality, CH2 for $\geq$, CH3 for $\leq$ while CH4 may be ignored all together by the use of the non-significant (#) comparison criterion.

Irrespective, however, of the search criterion employed, at the end of each character comparison interval, the state of *b*1 in T1 represents the match between the character read out from track TR1 and the character read out from the query register. Similarly, other bits in T1 represent the match between corresponding characters from the other tracks and the character from register 23. A "1" indicates a match while a "0" a mismatch. After the end of the character interval *b*1 in T1 is logically ANDed with *b*1 of T2, the latter acting as a bit which accumulates the block comparison from character-to-character, as previously explained. Various signal transfer techniques may be employed to perform the ANDing of bits *b*1 in T1 and T2, *b*2 in T1 and T2, etc. Thereafter, all bits in T1 are set to "1's" to determine the matching of subsequent readout characters with the next character read out from memory. In addition, the obsolete flags from track TROF (FIGURE 1) read out one flag each bit interval may be supplied through circuit 37 (FIGURE 1) to DD3 associated with T3 so that an obsolete flag is stored in each bit of T1 during each bit interval. As a result at the end of the reading out of a complete block, the bit in T2 indicates the matching of the block just read out from memory with the query record and the corresponding bit in T3 the significance of the block. These bits are then logically ANDed as herebefore described and the results stored in one of the C fields, the results of the comparisons B1 blocks in C1, B2 blocks in C2, etc.

Herebefore, it has been assumed that the transfer of the state of the T1 bit to the T2 bit occurs at the end of each character. However, it is not the intention to limit the invention thereto. The circuitry controlling the transfer of the T1 to the T2 fields may include means to control the transfer at the end of different length character fields. That is, in any given block some characters may be compared on a character-by-character basis and the results transferred to T2, while other characters may be compared as a group. In the latter case, the transfer to the T2 field occurs after the group of characters is read out. Thus, the comparison may be thought of as being performed on a field of characters. Registers 21*a* and 21*b* may be utilized to control the length of each field of characters compared with corresponding fields of characters of the records in memory 10.

As diagrammed in FIGURE 4, the entire associative memory including the C fields and the DP field may be formed by utilizing plated wire techniques, with appropriate use of the digit drivers and word drivers to control the storing of the binary signals in the various bits of the fields as well as perform the various transfer operations heretofore described. However, the invention is not intended to be limited thereto. Rather, any known associative memory-type construction may be employed to practice the teachings disclosed herein.

From the foregoing, it should be appreciated that by utilizing a relatively small, though expensive, associative-type memory, a large body of data storable in a relatively inexpensive memory such as a disc file may be searched in an efficient manner and data retrieved therefrom. In the foregoing description, a section containing sixty-four blocks in each of 1024 tracks, each block of 1024 bits for a total of $64 \times 1024 \times 1024$ or about $65 \times 10^6$ bits may be searched by the use of a memory consisting of only $64 \times 1024$ bits, arranged in a compare field matrix and four additional fields of 1024 each. It should be stressed that in the present invention, the actual data from memory 10 is never stored in memory 20. Only signals or flags indicating matching conditions are stored in the memory 20. The two memories are assumed to be controlled by a central unit which may be part of a general purpose computer to which the retrieved data may be supplied.

There has accordingly been shown and described herein a novel system for processing data. Briefly summarized, the system includes an array of compare bits which may be thought of as storage elements, each having two states, i.e. a "1" and a "0." Each element is associated with a block of data in a relatively inexpensive memory in which the data is stored on a plurality of tracks (such as 1024), each track comprising a plurality of blocks (64), each block consisting of a plurality of characters (128), while each character is of a plurality of bits (8). A query register stores a multicharacter query record equal in length to a block of data. Means are included in the memory to sequentially read out the data in each track, bit-by-bit, while all tracks are being read out in parallel.

Each field of characters in each block is compared bit-by-bit with a corresponding field of characters of the query record in accordance with a selected comparison criterion, such as equality, etc., so that at the end of the reading out of each block, its corresponding storage element is set to a "1" state, only if each field of characters thereof matched a corresponding field of characters of the query register in accordance with the selected comparison criterion. Thus, after all the blocks of data from memory have been read out, the storage elements corresponding to matched blocks are in a "1" state and all others in a "0" state. It is these elements and their states which are used to select and retrieve, i.e. read out through stage 55 (FIGURE 1) only the matched blocks of data. Means are also included to read out only selected portions of matched blocks. Though searching may be performed on a complete section such as 1024 tracks, retrieval may be limited to any desired portion of the section.

It is appreciated that those familiar with the art may make modifications and/or substitute equivalents in the arrangements as shown without departing from the spirit of the invention. Therefore, all such modifications and/or equivalents are deemed to fall within the scope of the invention as claimed in the appended claims.

What is claimed is:

1. A data storing and retrieval system comprising:
a memory for storing blocks of data in $n$ tracks, each track storing $x$ blocks, each block comprised of $y$ characters, said memory including means for sequentially reading out the blocks in each track character-by-character, corresponding blocks in said $n$ tracks being read out in parallel;
a query register for storing a block of query data of $y$ characters with which the $y$ characters of each block of data in said memory are to be compared with;
a plurality of storage elements each being controllable to be in either a first state or a second state, said elements being arranged in $n$ rows and $x$ columns to form a matrix, each of the $x$ elements in a row being associated with a different block of data in said memory, each row of elements corresponding to a different track;
compare means to which data read out in parallel from the $n$ tracks of said memory is supplied and responsive to the block of query data from said query register for comparing the data in each block from said memory with the query data in said register to set the element associated with each block of data in the memory to said first state if said block of data matches the query data field of characters by field of characters in accordance with any one of preselected comparison criteria, and to set the elements associated with blocks of data which do not match the query data to said second state; and
means for utilizing the states of said storage elements.

2. The system as recited in claim 1 wherein each character comprises a fixed equal number of bits each character being read out as a sequence of bits, said compare means including means for comparing each field of characters read out from memory with a corresponding field of characters in said query register bit-by-bit and provide a field of characters match signal only when the bits of the field of characters from memory match the bits of the field of characters from the query register in accordance with any one of a plurality of comparison criteria, each field of characters comprising at least one character.

3. The system as recited in claim 2 wherein said means for utilizing includes readout control means to which are supplied the blocks of data in each track sequentially read out from said memory bit-by-bit, with corresponding bits in said tracks being read out in parallel, and responsive to the states of said plurality of storage elements, for sequentially providing output signals representing at least selected portions of blocks of data which are associated with storage elements in said first state, whereby at least selected portions of blocks of data matching said query data field of characters by field of characters are read out.

4. The system as recited in claim 3 further including means to limit the response of said readout control means to storage elements in said first state which are in selected rows, so that said readout control means reads out only blocks of data which matched said query data which are located in tracks corresponding to said selected rows.

5. The system as recited in claim 3 further including means controlling said readout control means to read out only a selected portion of each block of data which matched said query data, field of characters by field of characters.

6. The system as recited in claim 5 further including means to limit the response of said readout control means to storage elements in said first state which are in selected rows so that said readout control means read out only selected portions of blocks of data which matched said query data which are located in tracks corresponding to said selected rows.

7. The system as recited in claim 3 wherein said readout control means further includes means for sequentially interrogating the states of the storage elements in each column to select an element in said first state in accordance with a predetermined significant criterion to control the subsequent readout of the block of data associated with the selected element.

8. The system as recited in claim 3 wherein said compare means include means for comparing the field of characters in each block from said memory with said field of characters in said query register in accordance with any of said plurality of comparison criteria which include equality, greater than, smaller than and a non-significant criterion, when compared in accordance with said non-significant criterion said means in said compare means provide a field of character match signal irrespective of the bit content of the field of characters from memory and the field of characters from said query register.

9. In combination with a memory in which data is stored in a section consisting of data tracks each track including X data blocks, each block of characters, said memory being adapted to operate in a read mode to provide simultaneously a stream of characters from each track, a data search and retrieval system for searching said section to determine the blocks of data therein matching a selected query block of data comprising:

a first plurality of storage elements arranged in matrix of $n$ rows and $x$ columns, each element having first and second binary states, the locations of elements in each row corresponding to the locations of the data blocks in another track;

a query register for storing a query block of data of $y$ characters; and comparing means coupled to said query register and said first plurality of storage elements and responsive to the streams of characters from said memory for comparing the block of data in said query register field of characters by field of characters with each of the blocks of data simultaneously read out from said memory said comparing means including means for setting each storage element to said first binary state when each field of characters in the block of data corresponding thereto matches a corresponding field of characters in the block of data in said query register in accordance with a selected comparison criterion, said comparing means further including means for setting each storage element to said second binary state when any one of the field of characters in the block corresponding thereto fails to match a corresponding field of characters in the block of data in said query register in accordance with a selected comparison criterion.

10. The system as recited in claim 9 further including a readout stage to which said streams of characters are supplied from said memory and responsive to the elements in said matrix which are in said first state for reading out only selected characters from data blocks whose corresponding elements are in said first state.

11. The system as recited in claim 9 wherein each character includes a plurality of data bits and said comparing means includes means for controlling the comparisons of each field of characters read out from said memory with a corresponding field of characters in said query register on a bit-by-bit basis in accordance with any one of a plurality of comparison criteria.

12. The system as recited in claim 11 wherein said comparing means include means for comparing the field of characters in said query register with each of the fields of characters simultaneously read out from said memory, field-of-characters-by-field-of-characters in accordance with said comparison criteria which include equality, greater than, smaller than, and a criterion whereby each field of characters from the memory is assumed to match a corresponding field of characters from the query register irrespective of the actual bit-by-bit comparison therebetween.

13. The system as recited in claim 11 wherein said comparing means further includes at least a first column of $n$ storage elements and a second column of $n$ storage elements each element having said first and second binary states, corresponding elements in said first and second columns being associated with one track of said memory, said comparing means including logic and control means for controlling each element in the first column to be in the first state at the end of each field of characters readout interval when the field of characters read out from the track associated therewith matches the corresponding field of characters in said query register bit-by-bit in accordance with the selected comparison criterion, said control means further controlling each element in the second column to be in the first state at the end of the reading out of a complete block of data if each field of characters in the block of data read out from the track associated therewith matches each corresponding field of characters in the query register in accordance with the selected comparison criterion, and means for transferring at the end of the readout of each block the state of each element in said second column to an element in said matrix which corresponds to the block which was read out.

14. The system as recited in claim 13 wherein said comparing means include means for comparing the field of characters in said query register with each of the fields of characters, simultaneously read out from said memory, field-of-characters-by-field-of-characters in accordance with said comparison criteria which include quality, greater than, smaller than, and a criterion whereby each field of characters from the memory is assumed to match the field of characters from the query register, irrespective of the actual bit-by-bit comparison therebetween.

15. In combination with a memory storing a body of data on at least one track consisting of X blocks of data, each block including $y$ characters the memory including means for reading out said data as a sequence of characters a system for searching said body of data to determine and retrieve the blocks of data which match a block of data in a query register comprising:

a row of $x$ storage elements each having first and second binary states and associated with one of the X data blocks in said memory, the position of the element in the row corresponding to the position of the data block in the track with which it is associated;

first and second tag storage elements, each having first and second binary states;

element control means for controlling the state of each element as a function of control signals supplied thereto;

a query register for storing a block of data of $y$ characters with which each of said data blocks is to be compared;

first means to which a sequence of characters read out from said memory is supplied for sequentially comparing the $y$ characters of each of said X blocks of data with the $y$ characters of the block of data in said query register character-by-character, said first means including means for controlling the element control means to set said first tag element to be in said first state at the end of each character comparison interval if the character read out from said memory matches a corresponding character in said query register in accordance with a selected comparison criterion and to set said first tag element to be in said second state if the character read out from said memory fails to match the corresponding character in the query register, said element control means including 'AND' gating means for logically combining the binary states of said first and second tag elements at the end of each character comparison interval so that at the end of the comparisons of all the $y$ characters of each block read out from memory with the $y$ characters in said query register the second tag element is in said first state only if all the characters of the block matched the characters in the query register character-by-character;

means for controlling said element control means to transfer at the end of each block comparison interval the binary state of said second tag element to a different one of said $x$ elements in said row, whereby at the end of the reading out of said $x$ blocks only the elements in said row associated with blocks of data which matched the block of data in said query register are in said first state and the other elements in said second state; and means for utilizing said $x$ elements to control a subsequent reading out of said $x$ blocks of data.

16. The system is recited in claim 15 wherein said memory stores a body of data on $n$ tracks each of $x$ blocks, each block of $y$ characters said system including $n$ rows each of $x$ storage elements arranged in an array of $n$ rows and $x$ columns each row of elements being associated with blocks in a different track, each element associated with a different block, the elements in each column being associated with corresponding blocks in said $n$ tracks, said system further including $n$ first tag elements and $n$ second tag elements, whereby at the end of reading out the blocks of data from said memory each element in said array is in a first state only if the block of data associated therewith matched character-by-character the block of data in said query register.

References Cited

UNITED STATES PATENTS

| | | | |
|---|---|---|---|
| 3,290,659 | 12/1966 | Fuller et al. | 340—172.5 |
| 3,290,661 | 12/1966 | Belcourt et al. | 340—173 |
| 3,311,887 | 3/1967 | Muroga | 340—172.5 |
| 3,332,069 | 7/1967 | Joseph et al. | 340—172.5 |

RAULFE B. ZACHE, Primary Examiner